Patented May 20, 1947

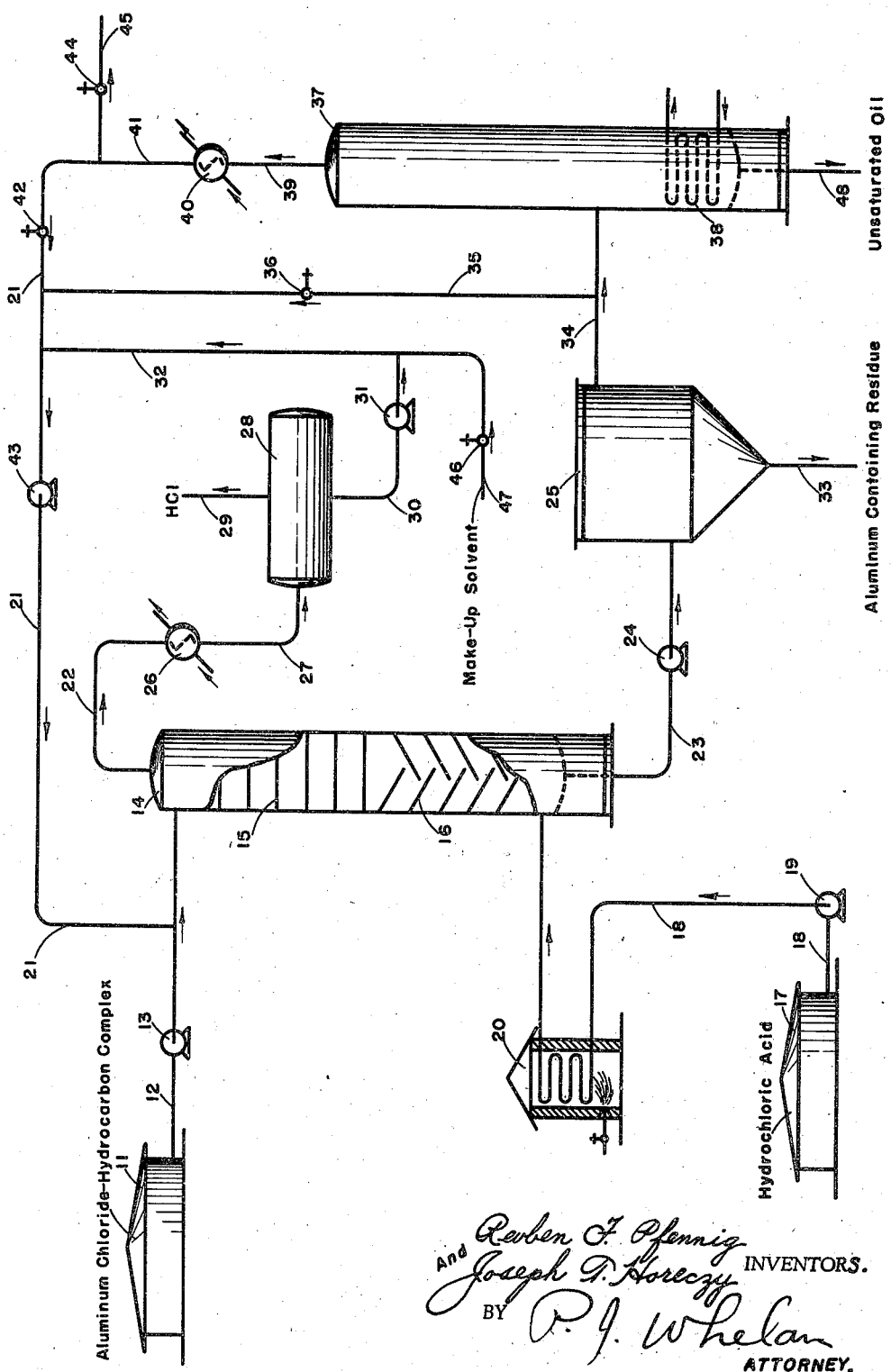

2,420,909

UNITED STATES PATENT OFFICE 2,420,909

MANUFACTURE OF HYDROGEN CHLORIDE

Reuben F. Pfennig, Goose Creek, and Joseph T. Horeczy, Cedar Bayou, Tex., assignors to Standard Oil Development Company, a corporation of Delaware Application July 2, 1943, Serial No. 493,226

13 Claims. (Cl. 23—154)

The present invention is directed to the production of anhydrous hydrogen chloride. More particularly, it is concerned with a method for manufacturing and recovering hydrogen chloride from aqueous hydrochloric acid and aluminum chloride complexes by contacting the aqueous acid and the complexes in an organic solvent.

The petroleum industry utilizes enormous quantities of hydrogen chloride and aluminum chloride in the various conversion processes which require these chemicals as promoter and catalyst for the reaction, respectively. For example, in the isomerization of normal paraffins to iso-paraffins, it is necessary to have present a minimum quantity of hydrogen chloride to promote the activity of the aluminum chloride catalyst. In other conversion operations in which aluminum chloride is used as a catalyst in the form of a liquid complex with hydrocarbons, hydrogen chloride is also employed to promote the reaction. This latter process employing the aluminum chloride as a liquid complex with hydrocarbons as the catalyst is especially applicable to isomerization of normal paraffinic naphthas to isoparaffinic hydrocarbons. In these operations large quantities of aluminum chloride are discarded in the spent complex employed as a catalyst. It will be obvious to the skilled worker in the art that recovery of the expensive reagents used in isomerization and conversion operations is necessary for economic reasons.

Various expedients have been suggested for handling aluminum chloride complexes and sludges discarded from the various isomerization and conversion operations. Among the numerous suggestions proposed is the treatment of aluminum chloride complexes and sludges with gaseous hydrogen chloride, chlorine and hydrogen while heating the sludges. None of the prior teachings have been entirely satisfactory in handling and utilizing the quantities of aluminum chloride complexes discarded from the aforementioned conversion operations.

In a pending application of one of us, U. S. Serial No. 489,782, filed June 5, 1943, is described a method for recovering hydrogen chloride from the spent aluminum chloride-hydrocarbon complexes by contacting the spent complex with aqueous hydrochloric acid under conditions whereby substantial amounts of the hydrogen chloride are recovered from the complex. In the practice of the aforementioned pending application, the contacting was preferably carried out by the so-called "powdered catalyst technique."

We have now discovered that larger quantities of hydrogen chloride may be recovered by contacting the aqueous hydrochloric acid with the spent aluminum chloride complexes dissolved in a suitable organic solvent than were obtained when proceeding in accordance with the method described in pending application U. S. Serial No. 489,782.

It is, therefore, the main object of the present invention to provide a continuous process whereby substantially all of the chlorine available in spent aluminum chloride complexes may be recovered by contacting the spent complexes with aqueous hydrochloric acid or other equivalent hydrolyzing means with the complex dissolved in an organic solvent.

In general, the present invention contemplates treatment of the spent aluminum chloride-hydrocarbon complexes with a hydrolyzing agent, the spent complex being dissolved in an organic solvent which does not react with the evolved hydrogen chloride, the aqueous acid or with the aluminum chloride-hydrocarbon complex. The solvent should be of the type which will dissolve the complex. The aluminum chloride-hydrocarbon complexes may be obtained as a by-product from any petroleum conversion operation in which aluminum chloride is used as a catalyst or treating agent. The present invention has particular application, however, to those liquid aluminum chloride-hydrocarbon complexes discarded from conversion operations in which petroleum hydrocarbons boiling in the gasoline or lighter range are subjected to a change in molecular structure.

In its more specific aspects, our invention comprises the treatment of aluminum chloride-hydrocarbon complexes discarded from operations in which petroleum naphthas are treated with aluminum chloride-hydrocarbon complexes for improvement of octane number. In the present invention, the complex is dissolved in a solvent such as o-dichloro-benzene and the resulting solution is then contacted at a temperature of about 265° F. with vaporized aqueous hydrochloric acid of a strength between about 22 and 38%. It is understood, of course, that other temperatures may be employed depending on the boiling point of the solvent selected. In general, temperatures in the range between 212° F. and 400° F. will be found suitable. The ratio of solvent to complex should be greater than 2:1, and preferably should be in the range of about 3:1 to 15:1. Solvent to complex ratios of about 10:1 have given excellent results.

The type of solvent employed should be one which does not react with the hydrogen chloride liberated from the hydrochloric acid and the complex charged or with the aluminum chloride-hydrocarbon complex treated. The solvent should have a relatively high boiling point, generally a boiling point above the temperature at which treating occurs. Furthermore, as mentioned before, the solvent should be capable of dissolving the complex. As examples of the types of solvents which are suitable in the practice of the process of the present invention may be mentioned chlorinated paraffinic and aromatic hydrocarbons, dioxane or the like. Other types of solvents fulfilling the requirements mentioned hereinabove may be used.

The amount of aqueous hydrochloric acid contacted with the solvent containing the aluminum chloride-hydrocarbon complex will vary depending on the concentration of the aqueous hydrochloric acid employed as the treating agent. In general, it may be stated that when strong solutions of hydrochloric acid are employed, a larger quantity of the acid will be required than when weak solutions are used. When an acid of about 30% hydrogen chloride is used about 8 to 10 parts of aqueous acid to about 20 parts of aluminum chloride-hydrocarbon complex should be used.

While any type of contacting means may be employed in treating the solution of aluminum chloride-hydrocarbon complex with the aqueous hydrochloric acid, it is preferred to use the countercurrent principle of flow in which the downflowing solvent containing the complex contacts the upflowing vaporized hydrochloric acid. However other mixing or contacting means may be utilized provided intimate contact is maintained and provision is made for separation of the released gaseous hydrogen chloride.

The present invention will be better understood by reference to the drawing in which the single figure is a flow diagram in partial section of a preferred embodiment of practicing the invention.

Referring now to the drawing, numeral 11 designates a storage vessel containing aluminum chloride-hydrocarbon complex resulting from the treatment of gasoline hydrocarbons with a complex of aluminum chloride and hydrocarbons. Storage vessel 11 is fluidly connected by means of line 12 and pump 13 to treating tower 14. Treating tower 14 is shown in section and comprises two portions. The upper portion 15 is packed with fractionating means. The fractionating means in the upper portion 15 may be bell-cap plates or their equivalent. The lower portion 16 of treating tower 14 is provided with cascade plates or similar arrangement of mixing means for maintaining turbulence of the material flowing downwardly therethrough.

Hydrochloric acid of a strength between about 22 and 38% is introduced from tank 17 by way of line 18, pump 19 and heater 20 into the lower portion of treating tower 14. Sufficient heat is supplied to the hydrochloric acid in heater 20 so that it immediately vaporizes on injection into treating tower 14. The ascending vaporous hydrochloric acid contacts the descending solution of aluminum chloride-hydrocarbon complex which is made up in a manner described below.

The aluminum chloride-hydrocarbon complex in storage tank 11 admixes in line 12 with a suitable organic solvent injected therein by way of line 21. As stated hereinabove, aluminum chloride-hydrocarbon complex in solution is introduced into the top of treating tower 14 and flows downwardly through the upper and then the lower section. While descending through treating tower 14 substantially all of the chlorine contained in the complex dissolved in the solution reacts with the aqueous acid and gaseous hydrogen chloride is removed from tower 14 by way of line 22 and is further handled as will be described hereinafter.

The solvent containing the reaction product of the aluminum chloride-hydrocarbon complex with the hydrochloric acid leaves treating tower 14 by way of line 23 and is pumped therethrough by pump 24 to settler 25 to be handled as will be described further.

The hydrogen chloride leaving treating tower 14 by way of line 22 passes through cooler 26 in which solvent vaporized and released from treating tower 14 is condensed. The cooled product leaving cooler 26 is introduced by way of line 27 into separator 28 which is provided with line 29 for removal of gaseous hydrogen chloride and with line 30 for discharge of condensed solvent. The condensed solvent is pumped by way of pump 31 to line 32 which connects with line 21 for recycling and admixture with additional quantities of aluminum chloride-hydrocarbon complexes introduced by way of line 12.

The solvent containing the liquid and solid reaction products leaving treating tower 14 is allowed to settle under influence of gravity in settler 25 whereby a separation is made between the aluminum-containing residue and the solvent which contains dissolved oily material. The aluminum-containing solid residual material is believed to be a compound represented by the formula $AlOCl$ or $Al_2O_3$ depending on the degree of removal of chlorine from the aluminum chloride-hydrocarbon complex in treating tower 14. The aluminum-containing residual material discharges from settler 25 by way of line 33 and then may be further treated by steaming to dryness for recovery of solvent which adheres to the solid particles; the dry material may be used as an ore for recovery of metallic aluminum or it may be used for production of aluminum chloride by heating the discharged dried material at high temperatures in the presence of chlorine whereby aluminum chloride is obtained. Economic considerations will dictate the best procedure for handling the solid material discharged from settler 25 by way of line 33.

The solvent substantially free of solid particles discharges from settler 25 by way of line 34 and may be divided into two streams: one stream may be routed through line 35 by opening valve 36 therein to line 21 for recycling and admixture with aluminum chloride-hydrocarbon complex introduced through line 12 to treating tower 14; the other portion may be injected into fractionating tower 37 which is equipped with heating means 38 for adjustment of temperatures and pressures therein.

In fractionating tower 37 the temperature of the solvent is raised so that a separation may be made between the hydrocarbon material dissolved in the solvent and the solvent itself. The solvent being of a lower boiling point, in the case when o-dichlorobenzene is employed, distills overhead from fractionating tower 37 and passes outwardly through line 39, and is condensed in cooler 40 which is connected by way of line 41 to line 21 whereby the solvent may be recycled to the treating tower 14. Line 21 is provided with valve 42 and pump 43. If it is not desired to recycle the solvent distilled overhead from fractionating tower 37, it may be discharged from the system by opening valve 44 in branch line 45. In usual practice, however, the solvent will be recycled as described.

There is discharged from fractionating tower 37 by way of line 48 an unsaturated oil which dissolves in the solvent in the reaction taking place in treating tower 14. This unsaturated oil has a high degree of unsaturation as evidenced by a bromine number of 100 to 125. This oil polymerizes on exposure to the atmosphere with a tacky film forming thereon.

When solvent is discharged from the process through branch line 45, it will be necessary to add an equivalent amount of make-up solvent by opening valve 46 in line 47 which connects to the source of solvent storage not shown.

The material leaving treating tower 14 by way of line 23 should be kept in a high degree of turbulence to prevent settling prior to entrance to settling zone 25. If a high degree of turbulence is not maintained, line 23 and pump 24 are likely to become clogged.

While settling zone 25 usually has a sufficient capacity so that substantially all of the solid particles drop downwardly therein and are removed from the solvent, in some instances where high charge rates are employed some of the particles may carry over with the solvent and oil leaving zone 25 by way of line 34. Therefore, it may be necessary to provide in line 34 filtering means for cleaning up the residual particles not settled out in zone 25.

The conditions of distillation in fractionating tower 37 will, of course, depend on the boiling point of the solvent used. It may be necessary in some instances to conduct the distillation under reduced pressure in fractionating tower 27 to prevent polymerization of unsaturated bodies in the solvent.

Our invention will be better understood by reference to the following runs in which a spent aluminum chloride-hydrocarbon complex resulting from the treatment of a gasoline hydrocarbon fraction with a liquid complex of aluminum chloride and hydrocarbons was treated in accordance with the present invention. In this particular run o-dichlorobenzene was employed as the solvent and hydrochloric acid of about 30% was used as the treating or hydrolyzing agent. 200 parts by weight of o-dichlorobenzene was admixed with 20 parts by weight of aluminum chloride-hydrocarbon complex. Hydrochloric acid of the strength mentioned was added to the solvent, the whole reaction body being maintained at a temperature of 265° F. Countercurrent conditions of contact were maintained until moisture began to appear in the overhead gases. The gases were cooled and measured. It was found that, of the amount of chlorine available in the aluminum chloride-hydrocarbon complex, 79% by weight had been recovered as hydrogen chloride, on the basis of 100% recovery of hydrogen chloride from the aqueous acid charged.

In another run similar to the preceding run, 200 parts of o-dichlorobenzene was employed to dissolve 20.5 parts by weight of spent aluminum chloride-hydrocarbon complex similar to that used in the preceding run. In this particular instance, steam, heated to a temperature of 265° F., was employed as the hydrolyzing agent. The reaction was conducted as described above until water appeared in the overhead gases. The overhead gases were cooled and measured and it was found that 81% by weight of the chlorine available in the aluminum chloride-hydrocarbon complex was recovered as hydrogen chloride.

It is obvious to the skilled worker that either aqueous hydrochloric acid or steam may be used as a hydrolyzing agent with equal success. However, it is preferred to use the aqueous hydrochloric acid as the hydrolyzing agent, since it is believed that the presence of hydrogen chloride is beneficial in that wetting of the reactants takes place more readily with hydrochloric acid than with steam. In the practice of our invention the hydrogen chloride released from the system by way of line 29 in most instances may be found to contain traces of moisture. Therefore, it will be necessary under certain conditions of operation to dry the gaseous hydrogen chloride. This may be done conveniently by passing the gaseous hydrogen chloride through a small body of sulfuric acid or equivalent drying reagent.

The nature and objects of the present invention having been fully described and illustrated, what we desire to claim as new and useful and to secure by Letters Patent is:

1. A process for the manufacture of hydrogen chloride which comprises the steps of dissolving an aluminum chloride-hydrocarbon complex in an organic solvent, the ratio of solvent to complex being at least two to one, contacting said solvent containing said dissolved complex with an aqueous hydrolyzing agent to form a reaction mixture, separating reaction products therefrom and recovering anhydrous hydrogen chloride from said reaction mixture.

2. A process in accordance with claim 1 in which said organic solvent is selected from the class of compounds capable of dissolving said aluminum chloride-hydrocarbon complex while being unreactive with the hydrolyzing agent, the aluminum chloride-hydrocarbon complex or the liberated hydrogen chloride.

3. A process in accordance with claim 1 in which the organic solvent is a chlorine-containing compound.

4. A process in accordance with claim 1 in which the hydrolyzing agent is aqueous hydrochloric acid.

5. A process for manufacturing hydrogen chloride which comprises dissolving an aluminum chloride-hydrocarbon complex in an organic solvent, the ratio of solvent to complex being in the range of 3:1 to 15:1, admixing said solvent containing dissolved aluminum chloride-hydrocarbon complex with aqueous hydrochloric acid while maintaining a temperature sufficient for reaction thereof, separating hydrogen chloride from the resulting reaction mixture, settling said solvent containing reaction bodies and recovering from said settled solvent mixture a hydrocarbon oil and solvent.

6. A process in accordance with claim 5 in which the solvent is a chlorinated compound.

7. A process in accordance with claim 5 in which the solvent is o-dichlorobenzene.

8. In the manufacture of anhydrous hydrogen chloride, the steps of admixing an aluminum chloride-hydrocarbon complex with an organic solvent capable of dissolving said complex, contacting the resulting solution of aluminum chloride-hydrocarbon complex with aqueous hydrochloric acid under countercurrent conditions at a temperature in the range of 212° to 400° F., separately removing from said contacting stage hydrogen chloride and the solvent containing reaction products, cooling said hydrogen chloride and separating solvent therefrom, settling said solvent containing reaction products and removing solid reaction products therefrom, distilling said solvent from which solid reaction products have been removed, and recovering from said solvent, free of solid reaction products, an unsaturated oil.

9. A process in accordance with claim 8 in which the solvent is a chlorinated paraffinic hydrocarbon.

10. A process in accordance with claim 8 in which the solvent is a chlorinated aromatic hydrocarbon.

11. A process in accordance with claim 8 in which the solvent is o-dichlorobenzene.

12. A process in accordance with claim 8 in which the solvent is dioxane.

13. A process for manufacturing hydrogen chloride which comprises dissolving an aluminum chloride-hydrocarbon complex in an organic solvent, the ratio of solvent to complex being in the range of 3:1 to 15:1, admixing said solvent containing dissolved aluminum chloride-hydrocarbon complex with an aqueous hydrolyzing agent while maintaining a temperature sufficient for reaction thereof, separating hydrogen chloride from said reaction mixture, settling said solvent containing reaction products and recovering from said solvent mixture a hydrocarbon oil and said solvent.

REUBEN F. PFENNIG.
JOSEPH T. HORECZY.

REFERENCES CITED

The following references are of record in the file of this patent:

UNITED STATES PATENTS

| Number | Name | Date |
|---|---|---|
| 1,202,031 | McAfee | Oct. 24, 1916 |
| 1,426,081 | Hoover | Aug. 15, 1922 |
| 1,865,797 | Shiffler | July 5, 1932 |